United States Patent [19]

Waddill et al.

[11] Patent Number: 4,485,229

[45] Date of Patent: Nov. 27, 1984

[54] EPOXY RESIN CONTAINING A COMBINATION OF HIGH AND LOW MOLECULAR WEIGHT POLYOXYALKYLENE POLYAMINE CURING AGENTS

[75] Inventors: Harold G. Waddill; Richard J. G. Dominguez, both of Austin, Tex.

[73] Assignee: Texaco Inc., White Plains, N.Y.

[21] Appl. No.: 580,482

[22] Filed: Feb. 15, 1984

[51] Int. Cl.³ .............................................. C08G 59/50
[52] U.S. Cl. .................................... 528/111; 525/504; 528/407
[58] Field of Search ................. 528/111, 407; 525/504

[56] References Cited

U.S. PATENT DOCUMENTS

| | | | |
|---|---|---|---|
| 3,306,809 | 2/1967 | Williamson et al. | 528/415 |
| 3,380,881 | 4/1968 | Williamson et al. | 528/415 |
| 3,462,393 | 8/1969 | Legler et al. | 528/107 |
| 3,645,969 | 2/1972 | Harvey | 528/111 |
| 4,115,360 | 9/1978 | Schulze et al. | 528/94 |
| 4,115,361 | 9/1978 | Schulze et al. | 528/111 |
| 4,141,885 | 2/1979 | Waddill | 528/93 |
| 4,146,700 | 3/1979 | Waddill et al. | 528/94 |
| 4,169,177 | 9/1979 | Waddill et al. | 528/112 |

*Primary Examiner*—Earl A. Nielsen
*Attorney, Agent, or Firm*—Jack H. Park; Kenneth R. Priem; David L. Mossman

[57] ABSTRACT

The adhesion properties of amine cured epoxy resins are unexpectedly enhanced by addition of a certain combination of high and low molecular weight polyoxyalkylene polyamines. The adhesively superior epoxy resin composition comprises a vicinal polyepoxide, a curing amount of a combination of about 85 wt. % or more of certain polyoxyalkylene polyamines having a molecular weight of less than about 450 and 15 wt. % or less of a polyoxyalkylene polyamine of greater than two primary amine functionality and a molecular weight of about 5,000 and above.

5 Claims, No Drawings

EPOXY RESIN CONTAINING A COMBINATION OF HIGH AND LOW MOLECULAR WEIGHT POLYOXYALKYLENE POLYAMINE CURING AGENTS

BACKGROUND OF THE INVENTION

This application is related to abandoned application Ser. No. 952,017 filed Oct. 16, 1978.

1. Field of the Invention

This invention relates to curable epoxy resins having increased adhesive strength; and more particularly to epoxy resins cured with a combination of certain high and low molecular weight polyoxyalkylene polyamines.

2. Related Publications

The adhesion and other properties of epoxy resins have been enhanced by the addition of certain additives. In the abandoned application mentioned above, U.S. Pat. Nos. 3,645,969 and 3,306,809 were cited as prior art. These references contain epoxy resin formulations containing polyoxyalkylene polyamines in various combinations. It is believed that the particular combination claimed herein is different from and not obvious in view of the materials claimed in these patents.

Applicant is the inventor or co-inventor on the following applications concerning epoxy resin compositions in which the adhesion or other properties of epoxy resins were enhanced by addition of certain materials. Of particular interest are those disclosed in U.S. Pat. Nos. 4,115,360; 4,141,885; 4,115,361; 4,146,700 and 4,169,177.

Additional patents concerning epoxy resins with enhanced properties wherein Applicant, Harold George Waddill, is an inventor or co-inventor are U.S. Pat. Nos. 4,002,598; 4,011,281; 4,110,309; 4,110,310; 4,110,313; 4,113,697; 4,116,938; 4,139,524; 4,146,701; 4,147,857; 4,178,426; 4,178,427; 4,187,367 and 4,219,638.

H. G. Waddill, National SAMPE Tech. Conf. Series, Vol. 11, 282–294 (1979) discusses the adhesive improving additive bis(carbamoyl) derivative of a polyoxyalkylene polyamine.

SUMMARY OF THE INVENTION

An epoxy resin composition having superior adhesion properties and being the cured reaction product of a curable admixture which comprises a vicinal polyepoxide having an epoxide equivalency of greater than 1.8 and a curing amount of a combination of polyamines comprising about 15 wt.% or less of a polyoxyalkylene polyamine having an amine functionality greater than 2 and a molecular weight of about 5,000 or more and about 85 wt.% or more of a polyoxyalkylene polyamine of functionality 2 or greater and a molecular weight of about 200–450.

DESCRIPTION OF THE PREFERRED EMBODIMENTS

According to the instant inventive concept, blends of a polyepoxide; a combination of about 85 wt.% or more, preferably 90 wt.% or more, of certain polyoxyalkylene polyamines having a molecular weight of less than about 450 and 15 wt.% or less, preferably 10 wt.% or less, of a polyoxyalkylene polyamine of greater than two primary amine functionality and a molecular weight of about 5,000 and above and, optionally, an accelerator and other standard ingredients are thoroughly admixed and cured in accordance with conventional methods to provide cured epoxy resins having unexpectedly superior adhesive strength.

The amine terminated polyether resins (polyoxyalkylene polyamines) useful in this invention are polyether resins made from an appropriate initiator to which lower alkylene oxides such as ethylene oxide, propylene oxide, butylene oxide or mixtures thereof are added with the resulting hydroxyl terminated polyol then being aminated. When two or more oxides are used, they may be present as random mixtures or as blocks of one or the other polyether. In the amination step it is highly desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. Therefore, the amine terminated polyether resins useful in this invention have greater than 50% of their active hydrogens in the form of amine hydrogens. If ethylene oxide is used it is desirable to cap the hydroxyl terminated polyol with a small amount of higher alkylene oxide to ensure that the terminal hydroxyl groups are essentially all secondary hydroxyl groups. The polyols so prepared are then reductively aminated as outlined, for example, in U.S. Pat. No. 3,654,370 and other prior art techniques.

According to one embodiment, a curable epoxy resin containing a glycidyl ether of 4,4'-isopropylidene bisphenol and a curing amount of a combination of polyamines comprising about 15 wt.% or less of a polyoxyalkylene polyamine, an amine functionality greater than 2 and a molecular weight of about 5,000 or more and about 85 wt.% or more of a polyoxyalkylene polyamine of functionality 2 or greater and a molecular weight of about 200–450.

Preferably, the high molecular weight polyoxyalkylene polyamines have the structure

wherein Y is hydrogen, a methyl radical or an ethyl radical, Z is a hydrocarbon radical of 3–5 carbon atoms, n is a number sufficient to impart a molecular weight of about 5,000 or more to the molecule and r is a number greater than 2.

Especially preferred is a high molecular weight polyoxyalkylene polyamine having the general structure:

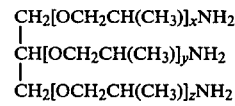

wherein x+y+z are numbers having a total such that the molecular weight of said polyoxyalkylene polyamine is about 5,000 or more.

Preferably, the low molecular weight polyoxyalkylene polyamines have the structure

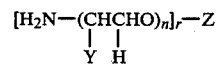

wherein Y is hydrogen, a methyl radical or an ethyl radical, Z is a hydrocarbon radical of 2–5 carbon atoms, n is a number sufficient to impart a molecular weight of about 200–450 to the molecular and r is a number 2 or greater.

Especially preferred are low molecular weight polyoxyalkylene polyamines of the general structure

wherein w is a finite number such that the molecular weight of said polyoxyalkylene polyamine is from about 200 to about 300 or the general structure

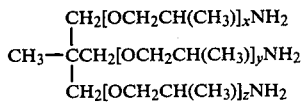

wherein x+y+z are finite numbers having a total such that the molecular weight of said polyoxyalkylene polyamine is about 400.

Generally, the amine cured vicinal polyepoxide containing compositions are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups; e.g., hydroxyl groups, ether radicals, aromatic halogen atoms and the like.

Preferred polyepoxides are those of glycidyl ethers prepared by epoxidizing the corresponding allyl ethers or reacting, by known procedures, a molar excess of epichlorohydrin and an aromatic polyhydroxy compound; i.e., isopropylidene bisphenol, novolak, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin, and the like, with either a polyhydric phenol or a polyhydric alcohol. An illustration, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones; e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis(4-hydroxycyclohexyl)dimethylmethane, 4,4-dimethylolbenzene, glycerol, 1,2,6-hexanetriol, trimethylolpropane, manniatol, sorbitol, erythritol, pentaerythritol, their dimers, trimers and higher polymers; e.g., polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as monothioglycerol, dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides which can be amine cured and are in accordance with the instant invention includes the epoxy novolak resins obtained by reacting, preferably in the presence of a basic catalyst; e.g., sodium or potassium hydroxide, an epihalohydrin, such as epichlorohydrin, with the resinous condensate of an aldehyde; e.g., formaldehyde, and either a monohydric phenol; e.g., phenol itself, or a polyhydric phenol. Further details concerning the nature and preparation of these epoxy novolak resins can be obtained in Lee, H. and Neville, K., *Handbook of Epoxy Resins*, McGraw-Hill Book Co., New York, 1967.

Other polyepoxides known to those skilled in the art may be useful in this invention.

Optionally, the epoxy resin formulations of the instant invention can include an "accelerator" to speed the amine cure of the epoxy resin, especially at ambient temperatures. In several applications, such acceleration is beneficial, especially when an epoxy resin is used as an adhesive in flammable environment, thus making elevated temperature cure inconvenient or even hazardous. Lee, H. and Neville, K., *Handbook of Epoxy Resins*, pp. 7–14 describes the use of certain amine-containing compounds as epoxy curing agent-accelerators.

Many accelerators are known in the art which can be utilized in accordance with the instant invention. Examples include salts of phenols, salicyclic acids, amine salts of fatty acids, such as those disclosed in U.S. Pat. No. 2,681,901, and tertiary amines such as those disclosed in U.S. Pat. No. 2,839,480. Preferred accelerators in accordance with the instant invention are disclosed in U.S. Pat. Nos. 3,875,072 and 4,195,153.

It will further be realized that various conveniently employed additives can be admixed with the polyepoxide containing composition of the instant invention prior to final cure. For example, in certain instances it may be desired to add minor amounts of other polyalkyleneamine co-catalysts as herein described, or hardeners along with various other accelerators and curing agent systems well known in the art.

Additionally, conventional pigments, dyes, fillers, flame retarding agents and the like which are compatible; natural or synthetic resins can be added.

Furthermore, although not preferred, known solvents for polyepoxide materials such as toluene, benzene, xylene, dioxane, ethylene glycol monomethyl ether and the like can be used. The polyepoxide resins containing the additives of the instant invention can be used in any of the above applications for which polyepoxides are customarily used. One outstanding feature of the instant composition resides in the fact that they are opaque upon curing and give a smooth, white lustrous surface which may be of particular benefit for certain molding and casting operations. The compositions of the instant invention can be used as impregnants, surface coatings, encapsulating compositions, laminants and, particularly and most importantly, as adhesive for bonding metallic elements or structures permanently together.

The following examples illustrate the nature of the instant invention but are not intended to be limitative thereof.

EXAMPLE 1

A polyoxyalkylene polyamine above a certain molecular size is necessary in order to develop enhanced adhesive properties when used in combination with a polyoxyalkylene polyamine of less than about 450. Those polyglycol amines of molecular weight less than 4,000 apparently are soluble in epoxy systems containing the low molecular weight polyoxyalkylene polyamine and, therefore, do not phase separate. Phase separation is necessary, apparently, for enhancement of adhesion properties. This may be shown as follows:

| Formulation | A | B | C | D | E | F |
|---|---|---|---|---|---|---|
| Epoxy resin[1] | 100 | 100 | 100 | 100 | 100 | 100 |
| JEFFAMINE ® D-230 | 32 | 31.2 | 30.9 | 30.5 | 29.9 | 29.1 |
| JEFFAMINE D-2000 | — | 1.5 | 3.5 | 7.6 | 12.8 | 19.4 |
| Accelerator 399 | 10 | 10 | 10 | 10 | 10 | 10 |
| Adhesive Properties, Cured 7 days, at 25° C. | | | | | | |
| Tensile shear strength, psi | 900 | 1100 | 1300 | 1200 | 1800 | 2600 |
| T-peel strength, pli | 2.2 | 2.8 | 2.0 | 1.2 | 1.9 | 2.8 |
| Appearance | Clear; no phase separation | | | | | |

| Formulation | G | H | I | J |
|---|---|---|---|---|
| Epoxy resin | 100 | 100 | 100 | 100 |
| JEFFAMINE D-230 | 31.2 | 31.0 | 30.5 | 29.9 |
| JEFFAMINE T-3000 | 1.6 | 3.4 | 7.6 | 12.8 |
| Accelerator 399 | 10 | 10 | 10 | 10 |
| Adhesive Properties, Cured 7 days at 25° C. | | | | |
| Tensile shear strength, psi | 1100 | 900 | 1350 | 1600 |
| T-peel strength, pli | 2.7 | 3.1 | 2.5 | 3.2 |
| Appearance | Clear; no phase separation | | | |

| Formulation | K | L | M | N |
|---|---|---|---|---|
| Epoxy resin | 100 | 100 | 100 | 100 |
| JEFFAMINE D-230 | 31.2 | 31.1 | 30.9 | 30.5 |
| JEFFAMINE D-4000 | 1.7 | 3.5 | 7.7 | 13.1 |
| Accelerator 399 | 10 | 10 | 10 | 10 |
| Adhesive Properties, Cured, 7 days at 25° C. | | | | |
| Tensile shear strength, psi | 1000 | 1100 | 1700 | 3200 |
| T-peel strength, pli | 2.7 | 1.9 | 3.3 | 6.6 |
| Appearance | Clear, no phase separation | | Partial phase separation cloudiness | Dense whitening; phase separation |

| Formulation | O | P | Q | R | S |
|---|---|---|---|---|---|
| Epoxy resin | 100 | 100 | 100 | 100 | 100 |
| JEFFAMINE D-230 | 31.3 | 31.2 | 30.9 | 30.6 | 30.3 |
| JEFFAMINE T-5000 | 1.6 | 3.4 | 7.8 | 13.2 | 20.1 |
| Accelerator 399 | 10 | 10 | 10 | 10 | 10 |
| Adhesive Properties, Cured 7 days at 25° C. | | | | | |
| Tensile shear strength, psi | 1400 | 2100 | 3500 | 3400 | 3300 |
| T-peel strength, pli | 0.9 | 2.3 | 3.4 | 9.6 | 13.9 |
| Appearance | Partial phase separation cloudiness | Dense whitening; phase separation | | | |

| Formulation | T | U | V | W |
|---|---|---|---|---|
| Epoxy resin | 100 | 100 | 100 | 100 |
| JEFFAMINE D-230 | 31.3 | 31.2 | 31.0 | 30.8 |
| Amin. THANOL ® G-6500 | 1.6 | 3.5 | 7.8 | 13.2 |
| Adhesive Properties, Cured 7 days at 25° C. | | | | |
| Tensile shear strength, psi | 1200 | 2250 | 2500 | 2850 |
| T-peel strength, pli | 1.1 | 2.0 | 6.2 | 8.0 |
| Appearance | Dense whitening; phase separation | | | |

[1] A diglycidyl ether of Bisphenol A of EEW ~ 185. This resin is used in all formulations in this application.

EXAMPLE 2

| | Curing with JEFFAMINE ® D-230 at 2 Hrs at 80° C. and Then 3 Hrs at 125° C. | | | | | | | | |
|---|---|---|---|---|---|---|---|---|---|
| Formulations | A | B | C | D | E | F | G | H | J |
| EPON 828 | 100 | 100 | 100 | 100 | 100 | 100 | 100 | 100 | 100 |
| JEFFAMINE D-230 | 32.0 | 31.2 | 30.9 | 30.5 | 29.9 | 32.0 | 31.1 | 30.9 | 30.6 |
| JEFFAMINE D-2000 | — | 1.5 | 3.5 | 7.6 | 12.8 | | | | |
| wt. % | 0.0 | 1.1 | 2.6 | 5.5 | 9.0 | | | | |
| JEFFAMINE T-5000 | | | | | | — | 3.5 | 7.8 | 13.2 |
| wt. % | | | | | | — | 2.6 | 5.6 | 9.2 |

| | Curing with JEFFAMINE D-230 at an Elevated Temperature | | | | | | |
|---|---|---|---|---|---|---|---|
| | T-Peel Strength (pli) at Concentration Level* (wt. %) of Additive | | | | | | |
| Additive | 0.0 | 1.1 | 2.6 | 5.5 | 5.6 | 9.0 | 9.2 |
| JEFFAMINE D-2000 | 1.5 | 2.6 | 2.2 | 2.4 | — | 2.4 | — |
| JEFFAMINE T-5000 | 1.5 | — | 5.8 | — | 10.3 | — | 14.1 |
| | Tensile Shear Strength, psi, at Concentration Level (wt. %) of Additive | | | | | | |
| Additive | 0.0 | 1.1 | 2.6 | 5.5 | 5.6 | 9.0 | 9.2 |
| JEFFAMINE D-2000 | 3850 | 4150 | 4200 | 3700 | — | 4400 | — |
| JEFFAMINE T-5000 | 3850 | — | 4500 | — | 4300 | — | 4000 |

*Wt. % is based on total system.

JEFFAMINE T-5000 is considerably more effective in enhancement of adhesion properties when added in small amounts to epoxy system cured with JEFFAMINE D-230 than is JEFFAMINE D-2000.

EXAMPLE 3

| Formulation | A | B | C | D | E | F | G | H | J | K | L | M |
|---|---|---|---|---|---|---|---|---|---|---|---|---|
| EPON ® 828 | 100 | 100 | 100 | 100 | 100 | 100 | 100 | 100 | 100 | 100 | 100 | 100 |
| JEFFAMINE D-230 | 32.0 | 31.2 | 31.0 | 30.5 | 29.9 | 29.1 | 32.0 | 31.2 | 31.0 | 30.5 | 29.9 | 32.0 |
| JEFFAMINE D-2000 | — | 1.6 | 3.5 | 7.8 | 13.1 | 19.9 | | | | | | |
| | | 1.6% | 2.4% | 5.2% | 8.5% | 12.5% | | | | | | |
| JEFFAMINE T-3000 | | | | | | | — | 1.6 | 3.5 | 7.8 | 13.1 | |
| | | | | | | | | 1.1% | 2.4% | 5.2% | 8.5% | |

| | | | | | | | | | | | |
|---|---|---|---|---|---|---|---|---|---|---|---|
| JEFFAMINE T-5000 | | | | | | | | | | | — |
| Amin. THANOL ® G-6500 | | | | | | | | | | | |
| Accelerator 399 | 10 | 10 | 10 | 10 | 10 | 10 | 10 | 10 | 10 | 10 | 10 | 10 |

| Formulation | N | P | Q | R | S | T | U | V | W | X | Y |
|---|---|---|---|---|---|---|---|---|---|---|---|
| EPON ® 828 | 100 | 100 | 100 | 100 | 100 | 100 | 100 | 100 | 100 | 100 | 100 |
| JEFFAMINE D-230 | 31.3 | 31.2 | 30.9 | 30.6 | 30.1 | 32.0 | 31.3 | 31.2 | 31.0 | 30.8 | 30.5 |
| JEFFAMINE D-2000 | | | | | | | | | | | |
| JEFFAMINE T-3000 | | | | | | | | | | | |
| JEFFAMINE T-5000 | 1.6 | 3.4 | 7.8 | 13.2 | 20.1 | | | | | | |
| | 1.1% | 2.4% | 5.2% | 8.5% | 12.5% | | | | | | |
| Amin. THANOL ® G-6500 | | | | | | — | 1.6 | 3.4 | 7.7 | 13.1 | 20.0 |
| | | | | | | | 1.1% | 2.4% | 5.2% | 8.5% | 12.5% |
| Accelerator 399 | 10 | 10 | 10 | 10 | 10 | 10 | 10 | 10 | 10 | 10 | 10 |

Rheometric Impact Properties on Curing With JEFFAMINE D-230: Ambient Temperature With Accelerator

| | Total Energy (E) in Lbs at Concentration Level (wt. %) of Additive | | | | | |
|---|---|---|---|---|---|---|
| Additive | 0 | 1.1 | 2.4 | 5.2 | 8.5 | 12.5 |
| JEFFAMINE D-2000 | 4 | 1 | 2 | 2 | 53 | 143 |
| JEFFAMINE T-3000 | 4 | 5 | 6 | 3 | 85 | — |
| JEFFAMINE T-5000 | 4 | 4 | 8 | 4 | 22 | 130 |
| Amine G-6500 | 4 | 9 | 2 | 9 | 6 | 16 |

Results were somewhat erratic but indicate improved impact properties with low concentrations of higher molecular weight polyoxyalkylene polyamines.

Examples 4 through 7 demonstrate the applicability of the invention to other low molecular weight polyoxyalkylene polyamines.

EXAMPLE 4

| Formulation | 70A | 70B | 70C | 70D | 70E |
|---|---|---|---|---|---|
| EPON ® 828 | 100 | 100 | 100 | 100 | 100 |
| JEFFAMINE ® T-403 | 42.7 | 42.5 | 42.0 | 41.6 | 40.8 |
| JEFFAMINE D-2000 | — | 1.4 (1%) | 4.4 (3%) | 7.5 (5%) | 12.2 (8%) |
| Adhesive Properties[1] | | | | | |
| Tensile Shear strength | 3800 | 3700 | 3750 | 4200 | 4300 |
| T-peel strength, pli | 2.2 | 2.3 | 2.4 | 2.2 | 2.7 |

[1]Cured 1 hour at 125° C.

EXAMPLE 5

| Formulation | 70A | 66C | 66D | 47C |
|---|---|---|---|---|
| EPON 828 | 100 | 100 | 100 | 100 |
| JEFFAMINE T-403 | 42.7 | 42.4 | 41.9 | 41.4 |
| JEFFAMINE T-5000 | — | 4.7 (3.2%) | 10.5 (6.9%) | 17.7 (11.1%) |
| Adhesive Properties | | | | |
| Tensile shear strength, psi | 3800 | 4200 | 4200 | 3600 |
| T-peel strength, pli | 2.2 | 11.2 | 6.1 | 11.4 |

EXAMPLE 6

| Formulation | 68A | 69A | 48A | 48B |
|---|---|---|---|---|
| EPON 828 | 100 | 100 | 100 | 100 |
| JEFFAMINE D-400 | 56.8 | 56.2 | 55.4 | 54.4 |
| JEFFAMINE T-5000 | — | 6.2 (3.8%) | 13.9 (8.2%) | 23.4 (13.2%) |
| Adhesive Properties[1] | | | | |
| Tensile shear strength, psi | 3000 | 3700 | 2600 | 2300 |
| T-peel strength, pli | 3.4 | 3.2 | 14.8 | 14.7 |

[1]Cured 1 hour at 125° C.

EXAMPLE 7

| Formulation | 68A | 68B | 68C | 68D | 68E |
|---|---|---|---|---|---|
| EPON 828 | 100 | 100 | 100 | 100 | 100 |
| JEFFAMINE D-400 | 56.8 | 56.4 | 55.8 | 55.1 | 54.0 |
| JEFFAMINE D-2000 | — | 1.6 (1%) | 4.8 (3%) | 8.1 (5%) | 13.4 (8%) |
| Adhesive Properties[1] | | | | | |
| Tensile shear strength, psi | 4000 | 4050 | 3900 | 2900 | 2600 |
| T-peel strength, pli | 3.4 | 2.9 | 3.2 | 3.6 | 4.5 |

[1]Cured 1 hour at 125° C.

GLOSSARY

| | |
|---|---|
| Accelerator 399 | a mixture of aminoethylpiperazine (5%), piperazine (25%) and triethanolamine (70%). A product of Texaco Chemical Co. |
| JEFFAMINE ® D-2000 | a polyoxyalkylene diamine of about 2000 molecular weight. A product of Texaco Chemical Co. |
| JEFFAMINE T-3000 | a polyoxyalkylene triamine of about 3000 molecular weight. A product of Texaco Chemical Co. |
| JEFFAMINE D-4000 | a polyoxyalkylene diamine of about 4000 molecular weight. A product of Texaco Chemical Co. |
| JEFFAMINE T-5000 | a polyoxyalkylene triamine of about 5000 molecular weight. A product of |

GLOSSARY -continued

| | |
|---|---|
| Aminated G-6500 | Texaco Chemical Co. a polyoxyalkylene triamine of about 6500 molecular weight. A product of Texaco Chemical Co. |
| JEFFAMINE D-230 | a polyoxyalkylene diamine of about 230 molecular weight. A product of Texaco Chemical Co. |
| JEFFAMINE D-400 | a polyoxyalkylene diamine of about 400 molecular weight. A product of Texaco Chemical Co. |
| JEFFAMINE T-403 | a polyoxyalkylene triamine of about 400 molecular weight. A product of Texaco Chemical Co. |
| EPON ® 828 | Liquid epoxy resin - a diglycidyl ether of Bisphenol A of EEW ~ 185. EEW is epoxy equivalent weight. |

We claim:

1. An epoxy resin composition having superior adhesion properties and being the cured reaction product of a curable admixture which comprises a vicinal polyepoxide having an epoxide equivalency of greater than 1.8 and a curing amount of a combination of polyamines comprising:
an effective amount of about 15 wt.% or less of a polyoxyalkylene polyamine having an amine functionality greater than 2 and a molecular weight of about 5,000 or more and about 85 wt.% or more of a polyoxyalkylene polyamine of functionality 2 or greater and a molecular weight of about 200 to 450.

2. An epoxy resin composition as in claim 1 wherein the polyoxyalkylene polyamine of about 15 wt.% or less has the structure

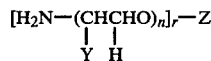

where Y is hydrogen, a methyl radical or an ethyl radical, Z is a hydrocarbon radical of 3–5 carbon atoms, n is a number sufficient to impart a molecular weight of about 5,000 or more of the molecule and r is a number greater than 2 and the polyoxyalkylene polyamine of about 85 wt.% or greater has the structure

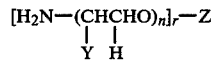

where Y is hydrogen, a methyl radical or a methyl radical, Z is a hydrocarbon radical of 2–5 carbon atoms, n is a number sufficient to impart a molecular weight of about 200–450 to the molecule and r is a number 2 or greater.

3. An epoxy resin composition as in claim 1 wherein the polyoxyalkylene polyamines of about 85 wt.% or greater have the general structures

wherein w is a finite number such that the molecular weight of said polyoxyalkylene polyamine is from about 200 to about 300 or the general structure

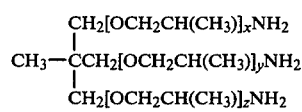

wherein x+y+z are finite numbers having a total such that the molecular weight of said polyoxyalkylene polyamine is about 400.

4. An epoxy resin composition as in claim 1 wherein the polyoxyalkylene polyamine of about 15 wt.% or less has the general structure

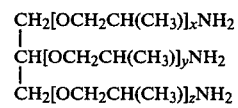

wherein x+y+z are numbers having a total such that the molecular weight of said polyoxyalkylene polyamine is about 5,000 or more.

5. An epoxy resin composition having superior adhesion properties and being the cured reaction product of a curable admixture which comprises a vicinal polyepoxide having an epoxide equivalency of greater than 1.8 and a curing amount of a combination of polyamines comprising an effective amount but about 15 wt.% or less of a polyoxyalkylene polyamine having the general structure

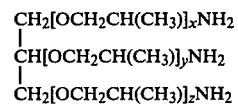

wherein x+y+z are numbers having a total such that the molecular weight of said polyoxyalkylene polyamine is about 5,000 or more and about 85 wt.% or more of polyalkylene polyamines of the general structure

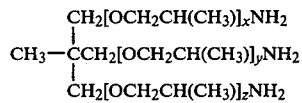

wherein x+y+z are finite numbers having a total such that the molecular weight of said polyoxyalkylene polyamine is about 400.

* * * * *